United States Patent
Vogel et al.

(10) Patent No.: US 9,713,886 B2
(45) Date of Patent: Jul. 25, 2017

(54) INSULATION MOULDING AND METHOD FOR ITS MANUFACTURE

(71) Applicant: Covestro Deutschland AG, Leverkusen (DE)

(72) Inventors: Stephanie Vogel, Langenfeld (DE); Reinhard Albers, Leverkusen (DE); Michael Loof, Leverkusen (DE); Frank Otto, Hilden (DE)

(73) Assignee: Covestro Deutschland AG, Leverkusen (DE)

(*) Notice: Subject to any disclaimer, the term of this patent is extended or adjusted under 35 U.S.C. 154(b) by 393 days.

(21) Appl. No.: 14/185,270

(22) Filed: Feb. 20, 2014

(65) Prior Publication Data

US 2014/0242313 A1    Aug. 28, 2014

(30) Foreign Application Priority Data

Feb. 25, 2013    (EP) .................................... 13156635

(51) Int. Cl.
| | |
|---|---|
| *B29C 44/42* | (2006.01) |
| *C08J 9/14* | (2006.01) |
| *B32B 5/20* | (2006.01) |
| *B32B 5/18* | (2006.01) |
| *B29C 44/02* | (2006.01) |
| *C08J 9/08* | (2006.01) |
| *C08G 18/42* | (2006.01) |
| *B29C 44/38* | (2006.01) |

(Continued)

(52) U.S. Cl.
CPC .............. *B29C 44/42* (2013.01); *B29C 44/02* (2013.01); *B29C 44/3403* (2013.01);

(Continued)

(58) Field of Classification Search
CPC ..... C08J 9/148; C08J 9/12; C08J 9/143; C08J 9/141; C08J 2375/08; C08J 9/08; C08J 9/14; C08J 2375/04; C08J 2375/06; C08J 2375/12; B29C 44/42; B29C 44/02; Y10T 428/1376; B32B 5/18; B32B 5/20; C08G 18/4018; C08G 18/42; C08G 18/4261;

(Continued)

(56) References Cited

U.S. PATENT DOCUMENTS

| | | | |
|---|---|---|---|
| 2002/0169228 A1 | 11/2002 | Riley et al. | |
| 2011/0196055 A1* | 8/2011 | Kramer ............. | C08G 18/4018 521/93 |

FOREIGN PATENT DOCUMENTS

| | | |
|---|---|---|
| EP | 0289764 A2 | 11/1988 |
| EP | 0905160 A1 | 3/1999 |
| WO | 0024813 A1 | 5/2000 |

* cited by examiner

*Primary Examiner* — Walter B Aughenbaugh
(74) *Attorney, Agent, or Firm* — K&L Gates LLP (57) ABSTRACT

A cavity between inner and outer walls of an open-box-shaped mold is filled with a polyurethane reaction mixture, containing an isocyanate and an emulsion of an isocyanate-reactive composition with three polyols and a blowing agent, which is cured to a polyurethane containing polymer. The inner and outer wall are a fixed distance from one another and each wall comprises a bottom and sides. The mixture is fed through an inlet in the bottom of the outer wall. Before filling the cavity, the mold is turned downwards so that the mixture foams upwards, filling the cavity. The three polyols are polyether polyol obtained by adding an epoxy to carbohydrates or difunctional or higher-functional alcohols; polyether polyol obtained by adding an epoxy to an aromatic amine; and polyester polyether polyol obtained by adding an epoxy to the esterification product of an aromatic dicarboxylic acid derivative and a difunctional or higher-functional alcohol.

22 Claims, 3 Drawing Sheets

(51) Int. Cl.
*C08G 18/40* (2006.01)
*C08G 18/48* (2006.01)
*F25D 23/06* (2006.01)
*B29C 44/34* (2006.01)
*C08G 101/00* (2006.01)
*B29B 7/74* (2006.01)
*C08J 9/12* (2006.01)

(52) U.S. Cl.
CPC .............. *B29C 44/383* (2013.01); *B32B 5/18* (2013.01); *B32B 5/20* (2013.01); *C08G 18/4018* (2013.01); *C08G 18/42* (2013.01); *C08G 18/4261* (2013.01); *C08G 18/482* (2013.01); *C08J 9/08* (2013.01); *C08J 9/14* (2013.01); *C08J 9/148* (2013.01); *F25D 23/064* (2013.01); *B29B 7/7471* (2013.01); *C08G 2101/00* (2013.01); *C08G 2101/0025* (2013.01); *C08J 9/12* (2013.01); *C08J 9/141* (2013.01); *C08J 9/143* (2013.01); *C08J 2375/04* (2013.01); *C08J 2375/06* (2013.01); *C08J 2375/08* (2013.01); *C08J 2375/12* (2013.01); *Y10T 428/1376* (2015.01)

(58) Field of Classification Search
CPC .............. C08G 18/482; C08G 2101/00; C08G 2101/0025
See application file for complete search history.

INSULATION MOULDING AND METHOD FOR ITS MANUFACTURE

CROSS REFERENCE TO RELATED APPLICATION

This application claims benefit to European Patent Application No. 13156635.8, filed Feb. 25, 2013, which is incorporated herein by reference in its entirety for all useful purposes.

BACKGROUND OF THE INVENTION

Field of the Invention

The invention relates to a method for the manufacture of an insulation moulding, in particular of a refrigerator cabinet, in which the moulding is provided by filling a cavity between an inner and an outer wall of an open-box-shaped mould with a polyurethane reaction mixture and allowing the polyurethane reaction mixture to cure to a polyurethane containing polymer C, the inner and outer wall being arranged in a fixed distance to one another and each wall comprising a bottom face and a plurality of side faces, whereas the polyurethane reaction mixture is fed through an inlet opening positioned in the middle area of the bottom face of the outer wall, wherein before filling the cavity, the mould is turned with the bottom face of the outer wall downwards so that the polyurethane reaction mixture is foaming upwards to fill the cavity. The invention further relates to a moulding prepared by that process and its use for insulating purposes.

Description of Related Art

It is known that in the production of foams from an isocyanate component and an isocyanate-reactive component containing polyol(s) using a physical blowing agent, it has a positive influence on the insulating effect of the foam to be produced if the physical blowing agent is emulsified in the isocyanate-reactive composition in the form of fine droplets. This positive influence on the insulating effect of the foam to be produced is caused by the fact that the droplets of emulsion that are formed act as nucleating agents for the subsequent foaming process. The more droplets that exist and the finer these droplets are, the more cells there are in the subsequent foam and above all the smaller the cells are. This fact has a direct influence on the insulating properties of the foam obtained in this way, since the smaller the foam cells that are formed, the better these properties are. Good insulating properties are reflected in a low thermal conductivity. The difficulty with the manufacture and processing of such emulsions is their stability, however. This stability is defined by the non-separation of polyol formulation and physical blowing agent on simple storage of such an emulsion under normal conditions with no additional external loading over a period of several hours to days, through to loading via temperature influences and increased pressure and influences of shear forces. Only emulsions that offer precisely this stability at least under normal conditions but preferably also under conditions involving temperature change, pressure changes and/or shear forces are thus of relevance in industry. These maturing processes are generally counteracted by means of a dramatic increase in viscosity up to a doubling of the viscosity of the liquid polyol phase. Since however the processing of emulsions is in any case made more difficult by their non-Newtonian behaviour, excessive rises in viscosity are undesirable.

EP 0 905 160 A1 describes stable emulsions containing blowing agent and incorporating polyether alcohols having a functionality greater than 1.5 and a hydroxyl value of 10 to 100 mg KOH/g as reactive emulsion stabilisers (see paragraph [0014]) in the polyol component for producing rigid foams based on isocyanates (see paragraph [0001]). The emulsions contain polyether alcohols, which are produced by the addition of low alkylene oxides, preferably ethylene oxide and/or propylene oxide, to OH- and/or NH-functional starter substances, for example sugar alcohols and aromatic amines (see paragraph [0025]). Polyester alcohols produced from polyfunctional carboxylic acids and polyfunctional alcohols are preferably also added to the polyether alcohols (see paragraph [0026]). The blowing agent is emulsified in the polyol mixture and a stable emulsion is obtained (see paragraph [0021]). The blowing agent can however also be added to the polyol mixture in or just in front of the mixing head. The specific combination of the three polyols A1a, A1b and A1c mentioned in the introduction is however not disclosed in this document. In particular, no polyester polyether polyols are disclosed.

US 2002/0169228 A1 claims a phase-stable polyol mixture comprising a propylene oxide-polyether polyol co-started with sucrose and dipropylene, a polyester polyol and a hydrocarbon having 4 to 6 carbon atoms as blowing agent, which is phase-stable for at least 24 hours (cf. claim 1). A polypropylene oxide-polyether polyol having an OH functionality of between 3.5 and 4.5 started with toluene diamine can additionally also be added to the mixture (see paragraph [0020]). The polyester polyol is started with phthalic anhydride (cf. claim 3) and is preferably STEPANPOL 2352, which is based on phthalic anhydride and diethylene glycol (see paragraph [0022]). Cyclopentane can be used as the blowing agent (see paragraph [0029]), which is either present in the polyol mixture in the form of a microemulsion (see paragraph [0006]), is added to the polyol mixture just in front of the mixing head or is fed to the mixing head as a separate stream (see paragraph [0027]). The polyol mixture is reacted with an organic polyisocyanate to form a polyurethane foam (cf. claim 17). The term "microemulsion" within the meaning of this application implies that the blowing agent is dissolved in the polyol mixture; see paragraph [0006]. This also becomes clear in paragraph [0013], where it is disclosed that the polyol mixture is no longer classed as phase-stable if it has a "cloudy appearance". The statement that the polyol composition has to remain phase-stable for at least 24 hours (see paragraph [0006]) suggests that the term "microemulsion" is used erroneously in this application. A true microemulsion is in the state of a thermodynamic minimum and is thus stable indefinitely, provided that the composition and temperature do not change. Unlike such microemulsions, emulsions are above all temperature-sensitive but also substance-sensitive. Heating and then subsequently cooling them to the starting temperature generally leads to an irreversible change in the disperse structure, which can cause the emulsion to break. Therefore maintaining the stability of a "true" emulsion as in the present invention is considerably more difficult than in the case of "microemulsions".

The application US 2002/0169228 A1 refers consistently to the solution of the blowing agent in the polyol mixture. According to this document all factors adversely affecting the solubility of the blowing agent should be avoided, which is why only propylene oxide is used in the production of the polyether polyols (see paragraph [0018]).

WO 00/24813 A1 describes the production of rigid polyurethane foams for the thermal insulation of refrigerators, for example (page 1, lines 3 to 5). The foams consist of organic polyisocyanates, a polyol mixture comprising polyether and/or polyester polyols, a blowing agent and further auxiliary agents and additives (cf. claim 1). The blowing agent consisting of cyclopentane and water is dispersed in the polyol mixture (cf. claim 1). The polyether polyols are produced by addition polymerisation of a polyhydroxyl alcohol with polyethylene oxide and/or propylene oxide (page 4, lines 11 to 15) and preferably have 3 to 6 OH groups (page 5, lines 13 to 15). Glycerol, sorbitol, sucrose and aromatic amines for example can be used as polyhydroxyl alcohols (page 5, lines 1 to 3 and 6 to 7). The polyester polyol can be produced from dicarboxylic anhydrides (e.g. phthalic anhydride) and diols (e.g. diethylene glycol) (page 5, lines 16 to 31) and preferably has two functional groups (page 6, lines 4 to 6). Polyether polyols started on aromatic amines are disclosed in this document in the comparative examples ("polyol K"). In these comparative examples pentane is dissolved and not emulsified in the polyol component (cf. Table 1 on p. 13). The content of polyol K is relatively high, at 40% (comparative example 1) and 50% (comparative example 2) respectively, relative to all polyols present.

Regarding the production methods, mouldings for refrigerator and/or freezer cabinets are typically produced by using moulds of the desired geometry and injecting a PUR/PIR-formulation through an inlet opening typically positioned at the edge between the later back wall and bottom of the cabinet.

A different approach is followed in EP 0 289 764 A2, in which a method as stated above applied, i.e. the polyurethane reaction mixture is injected through approximately the middle point of the later back wall of the refrigerator cabinet, whereas the mould is turned with its back side downwards during the foaming, so that the back wall is essentially horizontal. Although some improvement could be achieved with respect to the foam injection through an inlet opening typically positioned at the edge between the later back wall and bottom of the cabinet, the thermal insulation properties is not always satisfying. In particular the homogeneity of the foam is sometimes not satisfactory.

The objective of the present invention was to provide a method or the manufacture of an insulation moulding, in particular of a refrigerator cabinet, which provides improved thermal insulation properties, whereas these insulation properties should be in particular mostly identical at all positions of the moulding.

SUMMARY

An embodiment of the present invention is a method for the manufacture of an insulation moulding, in particular of refrigerating appliances, in which the moulding is provided by filling a cavity between an inner and an outer wall of an open-box-shaped mould (M) with a polyurethane reaction mixture and allowing the polyurethane reaction mixture to cure to a polyurethane containing polymer C, the inner and outer wall being arranged in a fixed distance to one another and each wall comprising a bottom face (3) and a plurality of side faces (1, 2, 4, 5), whereas the polyurethane reaction mixture is fed through an inlet opening (I) positioned in the middle area of the bottom face (3) of the outer wall, wherein before filling the cavity, the mould (M) is turned with the bottom face of the outer wall downwards so that the polyurethane reaction mixture is foaming upwards to fill the cavity,
characterized in that the polyurethane reaction mixture comprises an isocyanate component B which is reacted with an emulsion comprising (I) an isocyanate-reactive composition A, containing a polyol mixture A1 consisting of at least three polyols A1a, A1b and A1c as the continuous phase
and
(II) at least one physical blowing agent T as the disperse phase,
wherein:
(i) A1a is a polyether polyol having a hydroxyl value from 15 mg KOH/g to 550 mg KOH/g and a functionality from 1.5 to 6.0, obtained by the addition of an epoxy to one or more starter compound(s) selected from the group consisting of carbohydrates and difunctional or higher-functional alcohols;
(ii) A1b is a polyether polyol having a hydroxyl value from 100 mg KOH/g to 550 mg KOH/g and a functionality from 1.5 to 5.0, obtained by the addition of an epoxy to an aromatic amine;
(iii) A1c is a polyester polyether polyol having a hydroxyl value from 100 mg KOH/g to 450 mg KOH/g and a functionality from 1.5 to 3.5, obtained by the addition of an epoxy to the esterification product of an aromatic dicarboxylic acid derivative and a difunctional or higher-functional alcohol.

Another embodiment of the present invention is the above method, characterized in that the average size of the droplets of the physical blowing agent T is ≥0.1 μm to ≤20 μm, the droplet size being determined by using an optical microscope operating in bright field transmission mode, whereas the average size of the droplets of the physical blowing agent T is in particular ≥0.1 μm to ≤15 μm.

Another embodiment of the present invention is either of the above methods, characterized in that the polyether polyol A1a is a polyether polyol started on sucrose, mixtures of sucrose and propylene glycol, mixtures of sucrose and ethylene glycol, mixtures of sucrose, propylene glycol and ethylene glycol, sorbitol or mixtures of sorbitol and glycerol.

Another embodiment of the present invention is any of the above methods, characterized in that the polyether polyol A1b is a polyether polyol started on ortho-, meta- or para-toluoylene diamine or a mixture of isomeric toluoylene diamines and/or
in that the polyester polyether polyol A1c is a polyester polyether polyol obtained by the addition of an epoxy to the esterification product of a phthalic acid derivative with a difunctional or higher-functional alcohol selected from the group consisting of
1,2-propanediol, dipropylene glycol and higher homologues thereof, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol including higher homologues thereof, 2-methyl propanediol-1,3, neopentyl glycol, 3-methyl pentanediol-1,5, glycerol, pentaerythritol, 1,1,1-trimethylolpropane and carbohydrates having 5 to 12 carbon atoms and/or
in that the polyol mixture A1 additionally comprises:
(iv) a polyether polyol A1d started on an aliphatic amine or a polyhydric alcohol and having a hydroxyl value from 500 mg KOH/g to 1000 mg KOH/g and a functionality from 1.5 to 5.0 and/or
in that the polyol mixture A1 additionally comprises a polyether polyol A1g started on a polyhydric alcohol and having a hydroxyl value from 15 mg KOH/g to 550 mg KOH/g and a functionality from 1.5 to 5.0, in particular a hydroxyl value from 20 mg KOH/g to 530 mg KOH/g and a functionality from 1.5 to 4.0, more preferred a hydroxyl value from 25 mg KOH/g to 515 mg KOH/g and a functionality from 1.5 to 4.0.

Another embodiment of the present invention is any of the above methods, characterized in that the polyol mixture A1 additionally comprises:
(v) a difunctional to tetrafunctional amine-type or alcoholic chain extender or crosslinker.

Another embodiment of the present is any of the above methods, characterized in that the physical blowing agent T is selected from at least one member of the group consisting of
hydrocarbons, halogenated ethers and perfluorinated hydrocarbons having 1 to 8 carbon atoms.

Another embodiment of the present invention is any of the above methods, characterized in that the isocyanate-reactive composition A additionally comprises
(vi) water A2;
(vii) at least one stabiliser A3 selected from the group of polyether-polydimethyl siloxane copolymers;
and
(viii) at least one catalyst A4 selected from the group consisting of triethylenediamine, N,N-dimethylcyclohexylamine, dicyclohexylmethylamine, tetramethylenediamine, 1-methyl-4-dimethylaminoethyl piperazine, triethylamine, tributylamine, dimethylbenzylamine, N,N',N''-tris-(dimethylaminopropyl)hexahydrotriazine, tris-(dimethylaminopropyl)-amine, tris(dimethylaminomethyl)phenol, dimethylaminopropyl formamide, N,N,N',N'-tetramethyl ethylenediamine, N,N,N',N'-tetramethyl butanediamine, tetramethyl hexanediamine, pentamethyl-diethylenetriamine, pentamethyl dipropylenetriamine, tetramethyl diaminoethyl ether, dimethyl piperazine, 1,2-dimethyl imidazole, 1-azabicyclo[3.3.0]octane, bis-(dimethylaminopropyl) urea, N-methylmorpholine, N-ethylmorpholine, sodium-N-[(2-hydroxy-5-nonyl-phenyl)methyl]-N-methylaminoacetate, N-cyclohexyl morpholine, 2,3-dimethyl-3,4,5,6-tetrahydropyrimidine, triethanolamine, diethanolamine, triisopropanolamine, N-methyl diethanolamine, N-ethyl diethanolamine and dimethyl ethanolamine.

Another embodiment of the present invention is any of the above methods, characterized in that the mass ratio of A1:T is ≥5:1 to ≤12:1.

Another embodiment of the present invention is any of the above methods, characterized in that the polyol component A1 has a viscosity according to EN ISO 3219 at 25° C. of ≥1000 mPas to ≤18000 mPas.

Another embodiment of the present invention is any of the above methods, characterized in that the isocyanate component B is
a) at least one isocyanate B1 selected from the group consisting of toluoylene diisocyanate, diphenylmethane diisocyanate, polyphenyl polymethylene polyisocyanate, xylylene diisocyanate, naphthylene diisocyanate, hexamethylene diisocyanate, diisocyanatodicyclohexylmethane and isophorone diisocyanate,
or
b) an isocyanate-terminated prepolymer B2 produced from at least one polyisocyanate B1 and at least one isocyanate-reactive compound selected from at least one of the following polyols
b.1) polyether polyol having a hydroxyl value from 15 mg KOH/g to 550 mg KOH/g and a functionality from 1.5 to 6.0, obtained by the addition of an epoxy to one or more starter compound(s) selected from carbohydrates and difunctional or higher-functional alcohols (A1a);
b.2) polyether polyol having a hydroxyl value from 100 mg KOH/g to 550 mg KOH/g and a functionality from 1.5 to 5.0, obtained by the addition of an epoxy to an aromatic amine (A1b);
b.3) polyester polyether polyol having a hydroxyl value from 100 mg KOH/g to 450 mg KOH/g and a functionality from 1.5 to 3.5, obtained by the addition of an epoxy to the esterification product of an aromatic dicarboxylic acid derivative and a difunctional or higher-functional alcohol (A1c);
b.4) polyether polyol having a hydroxyl value from 500 mg KOH/g to 1000 mg KOH/g and a functionality from 1.5 to 5.0 (A1d);
b.5) polyether carbonate polyol having a functionality of ≥1.0 to 8.0 and a number-average molar mass from 400 g/mol to 10,000 g/mol (A1f),
b.6) polyether polyol having a functionality of 1.5 to 5.0 and a hydroxyl value from 15 mg KOH/g to 550 mg KOH/g (A1g)
or
c) a mixture of B1 and B2.

Another embodiment of the present invention is any of the above methods, characterized in that the reaction of the isocyanate component B with the emulsion is performed at isocyanate indexes of 95 to 130.

Another embodiment of the present invention is any of the above methods, characterized in that the middle area is arranged concentrically in the two-dimensional projection of the bottom face (3) and/or in that the middle area of the bottom face (3) of the outer wall is defined by a segment of the bottom face (3) which extends from the centroid of the two-dimensional projection of the bottom face (3) to not more than 10% of the longitudinal extent of the two-dimensional projection in each direction, preferably to not more than 5%.

Another embodiment of the present invention is any of the above methods, characterized in that the mould (M) is provided with at least one ventilation hole and/or in that the cavity is evacuated to a pressure lower than ambient pressure, in particular the pressure is reduced by ≥1 mbar up to ≤900 mbar, particularly by ≥20 mbar to ≤600 mbar and preferred by ≥50 mbar to ≤300 mbar.

Another embodiment of the present invention is any of the above methods, characterized in that the polyurethane reaction mixture is injected into the cavity through an injection nozzle being arranged at the inlet opening (I), whereas the inlet opening (I) or the injection nozzle is in particular provided with a baffle plate or a distributor head (D), whereas the distributor head (D) is preferably provided with a plurality of discharge outlets and/or that a plurality of discharge outlets are formed between the distributor head (D) and the bottom face (3) of the outer wall, the polyurethane reaction mixture being injected through the discharge outlets into the cavity in a substantially laminar manner, whereas the discharge outlets are in particular shaped as slits.

Another embodiment of the present invention is the above method, characterized in that the distributor head (D) is arranged at the inlet opening (I), preferably fixed to the bottom face (3) of the outer wall and supported on the bottom face of the inner wall, and/or in that the discharge outlets are arranged in such a way that the polyurethane reaction mixture is injected into the cavity substantially parallel to the bottom face (3) of the outer wall.

Another embodiment of the present invention is an insulation moulding, in particular of a refrigerator cabinet, obtainable by any of the above methods.

DETAILED DESCRIPTION OF A PREFERRED EMBODIMENT

This object is achieved by a method for the manufacture of an insulation moulding, in particular of refrigerating appliances, in which the moulding is provided by filling a cavity between an inner and an outer wall of an open-box-shaped mould with a polyurethane reaction mixture and allowing the polyurethane reaction mixture to cure to a polyurethane containing polymer C, the inner and outer wall being arranged in a fixed distance to one another and each wall comprising a bottom face and a plurality of side faces, whereas the polyurethane reaction mixture is fed through an inlet opening positioned in the middle area of the bottom face of the outer wall, wherein before filling the cavity, the mould is turned with the bottom face of the outer wall downwards so that the polyurethane reaction mixture is foaming upwards to fill the cavity, whereas the method is characterized in that the polyurethane reaction mixture comprises an isocyanate component B which is reacted with an emulsion comprising (I) an isocyanate-reactive composition A, containing a polyol mixture A1 consisting of at least three polyols A1a, A1b and A1c as the continuous phase
and
(II) at least one physical blowing agent T as the disperse phase, wherein:
(i) A1a is a polyether polyol having a hydroxyl value from 15 mg KOH/g to 550 mg KOH/g and a functionality from 1.5 to 6.0, obtained by the addition of an epoxy to one or more starter compound(s) selected from the group consisting of carbohydrates and difunctional or higher-functional alcohols;
(ii) A1b is a polyether polyol having a hydroxyl value from 100 mg KOH/g to 550 mg KOH/g and a functionality from 1.5 to 5.0, obtained by the addition of an epoxy to an aromatic amine;
(iii) A1c is a polyester polyether polyol having a hydroxyl value from 100 mg KOH/g to 450 mg KOH/g and a functionality from 1.5 to 3.5, obtained by the addition of an epoxy to the esterification product of an aromatic dicarboxylic acid derivative and a difunctional or higher-functional alcohol.

The use of the word "a" in conjunction with components according to the invention such as for example certain polyols shall not be understood within the meaning of this application as a numerical value. Expressions such as "a polyol" or similar thus only mean "precisely one (=1) polyol" if that is expressly stated. It is conceivable for example for there to be two polyols of the type A1a.

An "emulsion" within the context of the present invention is understood to be a finely divided mixture of two liquids, in which one liquid (namely the physical blowing agent T) is dispersed in the other liquid (namely the polyol mixture A1) in the form of fine droplets showing an average size ≥0.1 μm to ≤20 μm, the droplet size being determined by using an optical microscope operating in bright field transmission mode. Such an emulsion is different from both a true solution and a microemulsion. Microemulsions have such a finely divided disperse phase that light is no longer refracted. Such microemulsions therefore appear clear and transparent in the visible light range, whereas emulsions within the meaning of the present invention appear cloudy and exhibit strong light refraction. Moreover, microemulsions can be produced only with the aid of emulsifying aids, whereas although the use of emulsifying aids in the production of the emulsions according to the invention is not excluded in principle, it is not absolutely necessary and is therefore not preferred. According to this invention, the droplet size of the blowing agent T is preferably ≥0.1 μm to ≤15 μm and more preferred ≥1 μm to ≤15 μm. The size is determined via an optical microscope using bright field transmission microscopy. Suitable layer thicknesses for the optical inspection of the specimen are 20 μm to 40 μm.

"Physical blowing agents" within the context of the present invention are understood to be compounds that by virtue of their physical properties are highly volatile and do not react with the isocyanate component.

The "hydroxyl value" indicates the amount of potassium hydroxide in milligrams that is equivalent to the amount of acetic acid bound by the acetylation of one gram of substance. In the context of the present invention it is determined in accordance with the standard DIN 53240 in the December 1971 version.

"Functionality" within the context of the present invention refers to the theoretical functionality calculated from the known substances used and the proportions thereof.

The present invention also provides a method for producing a polyurethane-containing polymer C, in which an isocyanate component B is reacted with an emulsion according to the invention.

A "polyurethane-containing polymer C" is understood here to denote both polymers containing exclusively polyurethane groups (PUR groups) and polymers that additionally contain urea and/or polyisocyanurate groups (PIR groups).

The present invention also provides an insulation moulding, in particular of a refrigerator cabinet, which is obtainable by the inventive method.

The inventive method corresponds in principle to the production method described in EP 0 289 764 A2, which contents is completely incorporated herein by reference. The inventive arrangement of the production process with injecting the polyurethane reaction mixture through the middle area of the bottom wall of a box shaped mould in lying position, i.e. substantially horizontally, is further referred to as "top-flow-process". Surprisingly it has been found that through a polyurethane reaction mixture comprising the polyols A1a, A1b and A1c, the total viscosity of the isocyanate-reactive composition and hence also the total viscosity of the emulsion can be lowered in comparison to isocyanate-reactive compositions (polyol mixtures) of the prior art that form a solution with the physical blowing agent. It has moreover been found that the stability of the emulsions according to the invention can be increased markedly by the optimisation of certain parameters (such as the content of oxyethylene groups in the polyols used). Furthermore, the thermal conductivity values achieved can be improved through the right combination of optimised polyol emulsions with suitable NCO-terminated prepolymers. In particular it was surprisingly found that the thermal conductivity was highly identical on any position of the moulding and evenly distributed, which is regarded as a synergistic effect of the fast-curing polyol-mixture combined with the top-flow-process.

These and other findings are described below by reference to various embodiments and examples of the present invention, wherein the individual embodiments can be freely combined with one another provided that the converse is not clearly indicated from the context.

The production of the polyols A1a to A1c that can be used according to the invention (and optionally of further polyols, see below) is known in principle to the person skilled in the art and has already been described many times. Polyester polyols are obtained by polycondensation of dicarboxylic acid equivalents and low-molecular-weight polyols. Polyether polyols are obtained by polyaddition (anionic or cationic) of epoxies to suitable starter compounds. The addition of epoxies to polyester polyols leads to the polyester polyether polyols according to the invention. The polymerisation reactions are performed if necessary in the presence of suitable catalysts known to the person skilled in the art.

In preferred embodiments the polyether polyol A1a is started on sucrose, mixtures of sucrose and propylene glycol, mixtures of sucrose and ethylene glycol, mixtures of sucrose, propylene glycol and ethylene glycol, sorbitol or mixtures of sorbitol and glycerol. Preferred epoxies are 1,2-butylene oxide, 2,3-butylene oxide, ethylene oxide and propylene oxide, individually or in mixtures. Ethylene oxide and propylene oxide, which can be used individually or both together, are particularly preferred, wherein in the latter case both a random distribution of the oxyalkylene units derived from the ethylene oxide and propylene oxide and a selective production of block copolymers of a specific structure are conceivable. Mixtures of sucrose, propylene glycol and ethylene glycol are particularly preferred as the starter. Exclusively propylene oxide is particularly preferably used as the epoxy. The hydroxyl value of A1a is particularly preferably 100 mg KOH/g to 450 mg KOH/g and the functionality 2.5 to 5.

In preferred embodiments the polyether polyol A1b is started on ortho-, meta- or para-toluoylene diamine or a mixture of isomeric toluoylene diamines. ortho-Toluylene diamine is particularly preferably used as the starter. This can be in the form of a mixture of 2,3- and 3,4-isomers. In principle, however, the use of other aromatic amines is also conceivable, such as for example benzene diamine (all isomers) or methylene diphenyl diamine (all isomers). Preferred epoxies are 1,2-butylene oxide, 2,3-butylene oxide, ethylene oxide and propylene oxide, individually or in mixtures. Ethylene oxide and propylene oxide, which can be used individually or both together, are particularly preferred, wherein in the latter case both a random distribution of the oxyalkylene units derived from the ethylene oxide and propylene oxide and a selective production of block copolymers of a specific structure are conceivable. Propylene oxide is particularly preferably used, either alone or in a mixture with ethylene oxide. In the latter case the ratio by mass of propylene oxide to ethylene oxide is 0.25:1 to 4:1, most particularly preferably 0.5:1 to 2:1. In the case of block copolymers they are preferably terminated with propylene oxide.

In preferred embodiments the aromatic dicarboxylic acid derivative used in the production of the polyol A1c is a phthalic acid derivative, particularly preferably phthalic anhydride.

Preferred difunctional or higher-functional alcohols used in the production of the polyol A1c are ethylene glycol and diethylene glycol including higher homologues thereof, 1,2-propanediol, dipropylene glycol and higher homologues thereof, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol including higher homologues thereof, 2-methyl propanediol-1,3, neopentyl glycol, 3-methyl pentanediol-1, 5, glycerol, pentaerythritol, 1,1,1-trimethylolpropane and carbohydrates having 5 to 12 carbon atoms (such as isosorbide for example). Ethylene glycol and diethylene glycol are most particularly preferred.

Epoxies preferably used in the production of the polyol A1c are ethylene oxide and propylene oxide. These are used in an amount such that the content of oxyethylene groups is 5 mass % to 50 mass %, preferably 10 mass % to 40 mass %, particularly preferably 15 mass % to 30 mass %, relative to the total mass of the polyol A1c.

In certain embodiments the polyol mixture A1 can also contain further polyols. Thus (iv) a short-chain polyether polyol A1d started on an aliphatic amine or a polyhydric alcohol and having a hydroxyl value from 500 mg KOH/g to 1000 mg KOH/g, preferably from 600 mg KOH/g to 950 mg KOH/g, particularly preferably from 700 mg KOH/g to 900 mg KOH/g and a functionality from 1.5 to 5.0, preferably from 2.0 to 4.5, particularly preferably from 2.5 to 4.0, can also be present. A1d is particularly preferably obtained from the addition of epoxies to ethylene diamine or trimethylolpropane. Preferred epoxies are ethylene oxide and propylene oxide, with propylene oxide being particularly preferred.

The polyol mixture A1 can furthermore also contain (v) a difunctional to tetrafunctional amine-type or alcoholic chain extender or crosslinker A1e. A1e is preferably selected from glycerol, butanediol, ethylene glycol, diethylene glycol, propylene glycol, ethylene diamine, ethanolamine, triethanolamine, trimethylolpropane and pentaerythritol. Polyether carbonate polyols A1f, such as can be obtained for example by catalytic reaction of epoxies and carbon dioxide in the presence of H-functional starter substances (see for example EP 2 046 861A1), can additionally also be used in the polyol mixture A1. These polyether carbonate polyols generally have a functionality of greater than or equal to 1.0, preferably from 2.0 to 8.0, particularly preferably from 2.0 to 7.0 and most particularly preferably from 2.0 to 6.0. The number-average molar mass is preferably 400 g/mol to 10,000 g/mol and particularly preferably 500 g/mol to 6000 g/mol.

According to a further preferred embodiment of the inventive method, the polyol mixture A1 additionally comprises a polyether polyol A1g started on a polyhydric alcohol and having a hydroxyl value from 15 mg KOH/g to 550 mg KOH/g and a functionality from 1.5 to 5.0, in particular a hydroxyl value from 20 mg KOH/g to 530 mg KOH/g and a functionality from 1.5 to 4.0, more preferred a hydroxyl value from 25 mg KOH/g to 515 mg KOH/g and a functionality from 1.5 to 4.0. This is particularly useful as such polyether polyols A1g improve the flow properties of the polyurethane reaction mixture so that a lower amount of foam inhomogenities at the surface, a lower amount of air pockets occur and a better foam adhesion is achieved.

Within the context of this invention the number-average molar mass $M_n$ is determined by gel permeation chromatography in accordance with DIN 55672-1 from August 2007.

The physical blowing agent T is subject to no restrictions in principle, provided that it is not soluble in the polyol mixture A1 under the prevailing boundary conditions (temperature, pressure) (since an emulsion could not then be produced). The physical blowing agents for use according to the invention are preferably selected from hydrocarbons (e.g. n-pentane, isopentane, cyclopentane, butane, isobutane), ethers (e.g. methylal), halogenated ethers, perfluorinated hydrocarbons having 1 to 8 carbon atoms (e.g. perfluorohexane) and mixtures thereof with one another. In particularly preferred embodiments a pentane isomer or a mixture of various pentane isomers is used as the physical blowing agent T. Cyclopentane is exceptionally particularly preferably used as the blowing agent T.

In particularly preferred embodiments the emulsion according to the invention contains precisely one each of polyols A1a, A1b and A1c and, if each is present, precisely one each of polyols A1d, A1e and A1f. It is furthermore preferable for no further polyols to be present in addition to A1a, A1b and A1c and, if each is present, A1d, A1e and A1f, in other words in preferred embodiments the polyol mixture A1 consists of a maximum of six polyols.

It is generally advantageous for the isocyanate-reactive composition A also to contain further components in addition to the polyol mixture comprising A1. Such components are known in principle to the person skilled in the art and encompass for example water, foam stabilisers, catalysts, flame retardants and optionally further auxiliary substances and additives. In particularly preferred embodiments the isocyanate-reactive composition A additionally comprises (vi) water A2;
(vii) at least one foam stabiliser A3 selected from the group of polyether-polydimethyl siloxane copolymers, preferably copolymers functionalised with polyether side chains containing propylene oxide and/or ethylene oxide; and
(viii) at least one catalyst A4 selected from the group triethylenediamine, N,N-dimethylcyclohexylamine, dicyclohexylmethylamine, tetramethylenediamine, 1-methyl-4-dimethylaminoethyl piperazine, triethylamine, tributylamine, dimethylbenzyl amine, N,N',N''-tris-(dimethylaminopropyl)hexahydrotriazine, tris-(dimethylaminopropyl) amine, tris (dimethylaminomethyl)phenol, dimethylaminopropyl formamide, N,N,N',N'-tetramethyl ethylenediamine, N,N,N',N'-tetramethyl butanediamine, tetramethyl hexanediamine, pentamethyl diethylenetriamine, pentamethyl dipropylenetriamine, tetramethyl diaminoethyl ether, dimethyl piperazine, 1,2-dimethyl imidazole, 1-azabicyclo[3.3.0]octane, bis-(dimethylaminopropyl) urea, N-methylmorpholine, N-ethylmorpholine, sodium-N-[(2-hydroxy-5-nonylphenyl)methyl]-N-methylaminoacetate, N-cyclohexyl morpholine, 2,3-dimethyl-3,4,5,6-tetrahydropyrimidine, triethanolamine, diethanolamine, triisopropanolamine, N-methyl diethanolamine, N-ethyl diethanolamine, dimethyl ethanolamine, together where necessary (if high polyisocyanurate contents are desired) with at least one catalyst selected from the group tin(II) acetate, tin(II) octoate, tin(II) ethylhexoate, tin(II) laurate, dibutyl tin diacetate, dibutyl tin dilaurate, dibutyl tin maleate, dioctyl tin diacetate, tris-(N,N-dimethylaminopropyl)-s-hexahydrotriazine, tetramethylammonium hydroxide, sodium acetate, sodium octoate, potassium acetate, potassium octoate, sodium hydroxide.

The water fulfils the function of a chemical co-blowing agent, i.e. the reaction with the isocyanate groups releases carbon dioxide, which acts as a blowing agent in addition to T.

In order to establish a stable emulsion it is furthermore advantageous to adhere to certain proportions of blowing agent T to the polyol mixtures A1. In preferred embodiments the invention thus relates to an emulsion in which the mass ratio of A1:T is preferably ≥5:1 to ≤12:1, more preferably ≥10:1 to ≤5:1, most preferably ≥9:1 to ≤6:1.

In preferred embodiments of the emulsion according to the invention the components of the isocyanate-reactive composition A are present in the following percentages by mass, independently from one another and relative in each case to the total mass of the isocyanate-reactive composition A:

Polyol A1a from 5 mass % to 60 mass %, preferably from 15 mass % to 50 mass %,
Polyol A1b from 5 mass % to 60 mass %, preferably from 10 mass % to 50 mass %,
Polyol A1c from 5 mass % to 60 mass %, preferably from 15 mass % to 50 mass %,
optionally Polyol A1d from 1 mass % to 20 mass %, preferably from 1 mass % to 15 mass %,
optionally Polyol A1e from 1 mass % to 20 mass %, preferably from 1 mass % to 15 mass %,
optionally Polyol A1f from 1 mass % to 20 mass %, preferably from 1 mass % to 15 mass %,
optionally Polyol A1g from 1 mass % to 20 mass %, preferably from 1 mass % to 15 mass %,
Water A2 from 0 mass % to 5 mass %, preferably from 0.5 mass % to 3 mass %,
Foam stabiliser A3 from 1 mass % to 10 mass %, preferably from 1.5 mass % to 8 mass %,
Catalyst A4 from 0.5 mass % to 5 mass %, preferably from 1 mass % to 4 mass %.

The emulsion according to the invention preferably contains the polyol mixture A1 in a percentage by mass of 80 mass % to 90 mass % and the physical blowing agent T in a percentage by mass of 10 mass % to 20 mass %, relative in each case to the total mass of the emulsion.

If several representatives of a component are present (e.g. a mixture of two physical blowing agents T, T1 and T2), the aforementioned percentages by mass apply to the sum of the representatives of a component (i.e. in the above example of two physical blowing agents T, the sum of the percentages by mass of T1 and T2 in the emulsion is 10 mass % to 20 mass %).

In particularly preferred embodiments no further components are present, in other words the emulsion particularly preferably consists at most of A1a, A1b, A1c, A1d, A1e, A1f, A2, A3, A4 and T. The emulsion exceptionally particularly preferably consists of A1a, A1b, A1c, A2, A3, A4 and T.

The production of the emulsions according to the invention preferably takes place in a manner such that the individual components of the polyol mixture A1 (i.e. at least polyols A1a, A1b and A1c, optionally further polyols and optionally auxiliary substances and additives as defined above) are mixed together in any order, generally at atmospheric pressure and temperature, and then the blowing agent T is added to the polyol mixture A1 thus obtained.

The emulsions may be prepared by mixing the components for A in arbitrary order, in general at room temperature and ambient pressure and then adding the blowing agent T. The emulsifying may take place using a high shear mixer such as a jet dispergator or a rotor dispergator. Representative examples include those published in Schubert, H. (editor); Emulgiertechnik; R. Behr's Verlag, Hamburg, 2005.

The emulsions according to the invention are characterised by high stability, without this having to be bought at the price of an excessively increased viscosity. "Stable" is understood to mean here that the emulsion can be stored for at least 2 hours, preferably for at least 1 day, particularly preferably for at least 3 days, most particularly preferably for at least 5 days, at room temperature and under normal pressure, without a phase separation of the polyol mixture A1 and blowing agent T occurring. The viscosity of the polyol mixture A1 according to the invention at 25° C. of ≥1000 mPas to ≤18000 mPas, particularly preferably ≥1500 mPas to ≤12000 mPas and most particularly preferably ≥2000 mPas to ≤12000 mPas. The viscosity is determined in accordance with EN ISO 3219 in the October 1994 version.

The invention also provides a method for producing a polyurethane-containing polymer C, in which an isocyanate component B is reacted with an emulsion according to the invention comprising the polyol mixture A1 and a physical blowing agent T. The production of polyurethane-containing polymers from isocyanate components and isocyanate-reactive components in the presence of blowing agents and optionally further auxiliary substances and additives is known in principle to the person skilled in the art and has already been described many times. The polyurethane-containing polymers C are preferably produced by methods known to the person skilled in the art. Examples are described in U.S. Pat. No. 2,764,565, in G. Oertel (Ed.) "Kunststoff-Handbuch", Volume VII, Carl Hanser Verlag, 3$^{rd}$ edition, Munich 1993, p. 267 to 354, and in K. Uhlig (Ed.) "Polyurethan Taschenbuch", Carl Hanser Verlag, 2$^{nd}$ edition, Vienna 2001, p. 83 to 102. Foaming of the components to form the polyurethane-containing polymer C can take place in principle in the manner known from the prior art cited by way of example.

In preferred embodiments of the method according to the invention the isocyanate component B is
 a) at least one isocyanate B1 selected from the group consisting of
  toluoylene diisocyanate, diphenylmethane diisocyanate, polyphenyl polymethylene polyisocyanate (PMDI), xylylene diisocyanate, naphthylene diisocyanate, hexamethylene diisocyanate, diisocyanatodicyclohexylmethane and isophorone diisocyanate,
 or
 b) an isocyanate-terminated prepolymer B2 produced from at least one polyisocyanate B1 and at least one isocyanate-reactive compound selected from at least one of the polyols A1a, A1b, A1c, A1d and A1f, or
 c) a mixture of B1 and B2.

The reaction of the isocyanate component B with the emulsion A is preferably performed at isocyanate indexes from 95 to 180, preferably from 95 to 150, particularly preferably from 100 to 130. The "isocyanate index" is understood to be the quotient of the amount of isocyanate groups actually used [mol] and the amount of isocyanate groups stoichiometrically required for the complete reaction of all isocyanate-reactive groups [mol], multiplied by 100. Since one mol of an isocyanate group is required for the reaction of one mol of an isocyanate-reactive group, Isocyanate index=(mols of isocyanate groups/mols of isocyanate-reactive groups)·100

The present invention also provides the polyurethane-containing polymers C obtainable by the method according to the invention described above. Such polyurethane-containing polymers C can be produced by continuous and discontinuous processing methods and are particularly suitable for use as insulating materials.

Discontinuously produced polyurethane-containing polymers C are moulded foams, which are delimited on both the top and bottom by décor layers. Metals, plastics, wood and paper inter alia are suitable as décor layers. Areas of application for such discontinuously produced PUR composite elements that can be cited in particular are the industrial insulation of appliances such as refrigerators, freezers, combined refrigerator-freezers and water heaters, chill containers and cool boxes and also pipes.

Continuously produced polyurethane-containing polymers C are continuously produced PUR foam blocks of defined width and variable thickness, which are preferably delimited on both the top and bottom by décor layers. In certain areas of application (in construction for example), it is however also possible to dispense completely with décor layers. Metals, metal foils, plastics, wood and paper are primarily suitable as décor layers. Areas of application for such continuously produced polyurethane-containing polymers C that can be cited in particular are the industrial insulation of cold stores and thermal insulation in the building sector.

The use of polyurethane-containing polymers in these areas is known in principle to the person skilled in the art and has already been described many times. The polyurethane-containing polymers C according to the invention are exceptionally suitable for these purposes, as they are characterised by low thermal conductivity values, without there being any risk of processing problems in the production of the foams or in their application on suitable substrates (such as refrigerator housings or pipes) due to excessively high viscosities.

In the inventive method it is further preferred that the middle area is arranged concentrically in the two-dimensional projection of the bottom face. This is advantageous because the injection point is equally distanced with respect to opposite positions of the mould.

The inventive method does in principle not require that the point of injection is the mathematically correct middle point, i.e. the centroid of the two-dimensional projection of the bottom face, although such an embodiment is part of the invention. However for most applications it is sufficient that the middle area of the bottom face of the outer wall is defined by a segment of the bottom face which extends from the centroid of the two-dimensional projection of the bottom face to not more than 10% of the longitudinal extent of the two-dimensional projection in each direction, preferably to not more than 5%.

The mould used for the inventive method can be any typical type of mould, in particular for the production of refrigerator cabinets. In an embodiment of the inventive method, the mould is provided with at least one ventilation hole so that the air from the mould can escape while it is displaced by the expanding foam in the cavity.

In a further preferred embodiment of the inventive method, the cavity is evacuated to a pressure lower than ambient pressure, in particular the pressure is reduced by ≥1 mbar up to ≤900 mbar, particularly by ≥20 mbar to ≤600 mbar and preferred by ≥50 mbar to ≤300 mbar. This is advantageous as the foaming process is supported by the evacuated cavity. This vacuum-supported method can be carried out by placing the whole mould into an evacuation chamber. Alternatively, the mould itself can be evacuated, whereas in this case, a mould without ventilation holes or with sealable ventilation holes should be used.

The polyurethane reaction mixture is preferably injected into the cavity through an injection nozzle being arranged at the inlet opening, whereas the inlet opening or the injection nozzle is in particular provided with a baffle plate or a distributor head. The distributor head can be provided with a plurality of discharge outlets and/or a plurality of discharge outlets are formed between the distributor head and the bottom face of the outer wall. In such an arrangement, the polyurethane reaction mixture is injected through the discharge outlets into the cavity in a substantially laminar manner, whereas the discharge outlets are preferably shaped as slits. The use of a distributor head is particularly preferred as its injection profile and geometry can be precisely adapted to the form of the cavity, thus optimizing the injection process. In particular with the fast curing systems of the present invention, this is advantageous because the polyurethane reaction mixture has less time to spread on the surface before its viscosity starts to increase.

The distributor head can be arranged at the inlet opening and is preferably fixed to the bottom face of the outer wall and supported on the bottom face of the inner wall. In other words, the distributor head is a component of the mould whereas fixation to the bottom face of the outer wall and support on the bottom face of the inner wall keeps it safe in the desired position during the production process.

The discharge outlets can for example be arranged in such a way that the polyurethane reaction mixture is injected into the cavity substantially parallel to the bottom face of the outer wall. This arrangement has the advantage that the impact point of the injected reaction mixture is mainly defined by the injection pressure, or in other words, by the injection velocity.

All the references described above are incorporated herein by in their entireties for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

EXAMPLES

Figure 1:
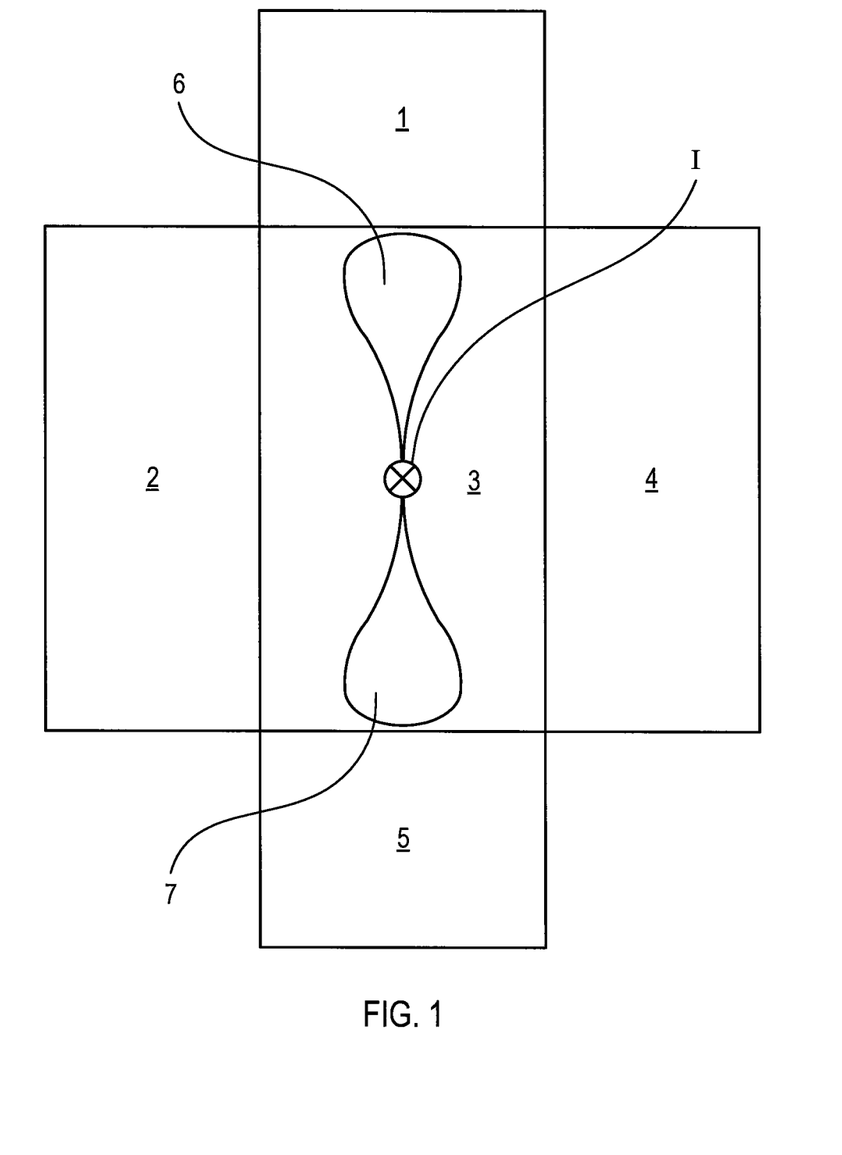
FIG. 1 shows a top view of the outer wall of an unfolded open-box shaped mould.

The invention is illustrated in more detail by the FIGS. 1-3 and the examples below. The FIGS. 1-3 show:

FIG. 1 shows a top view of the outer wall of an unfolded open-box shaped mould.

Figure 2A:
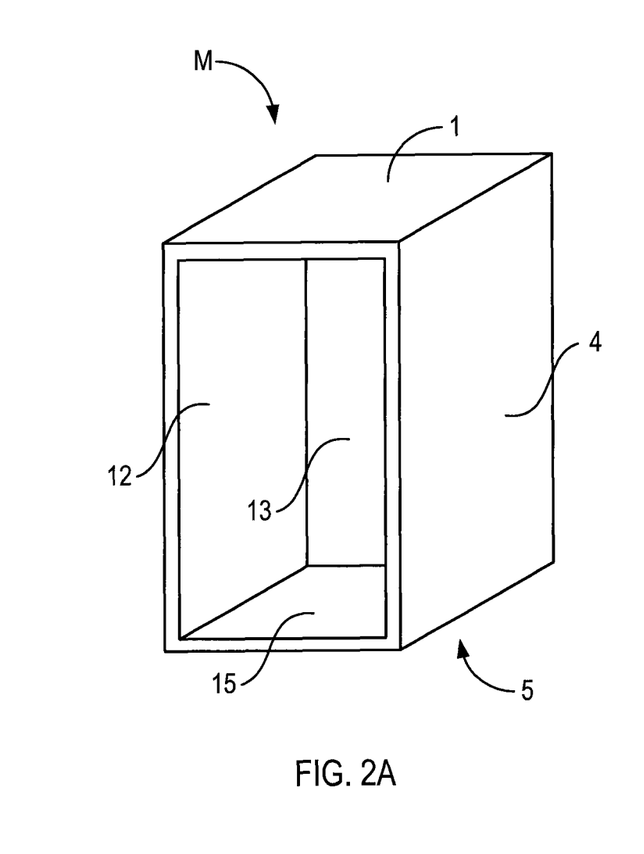
FIG. 2A shows a front perspective view of an open-box shaped mould.
Figure 3:
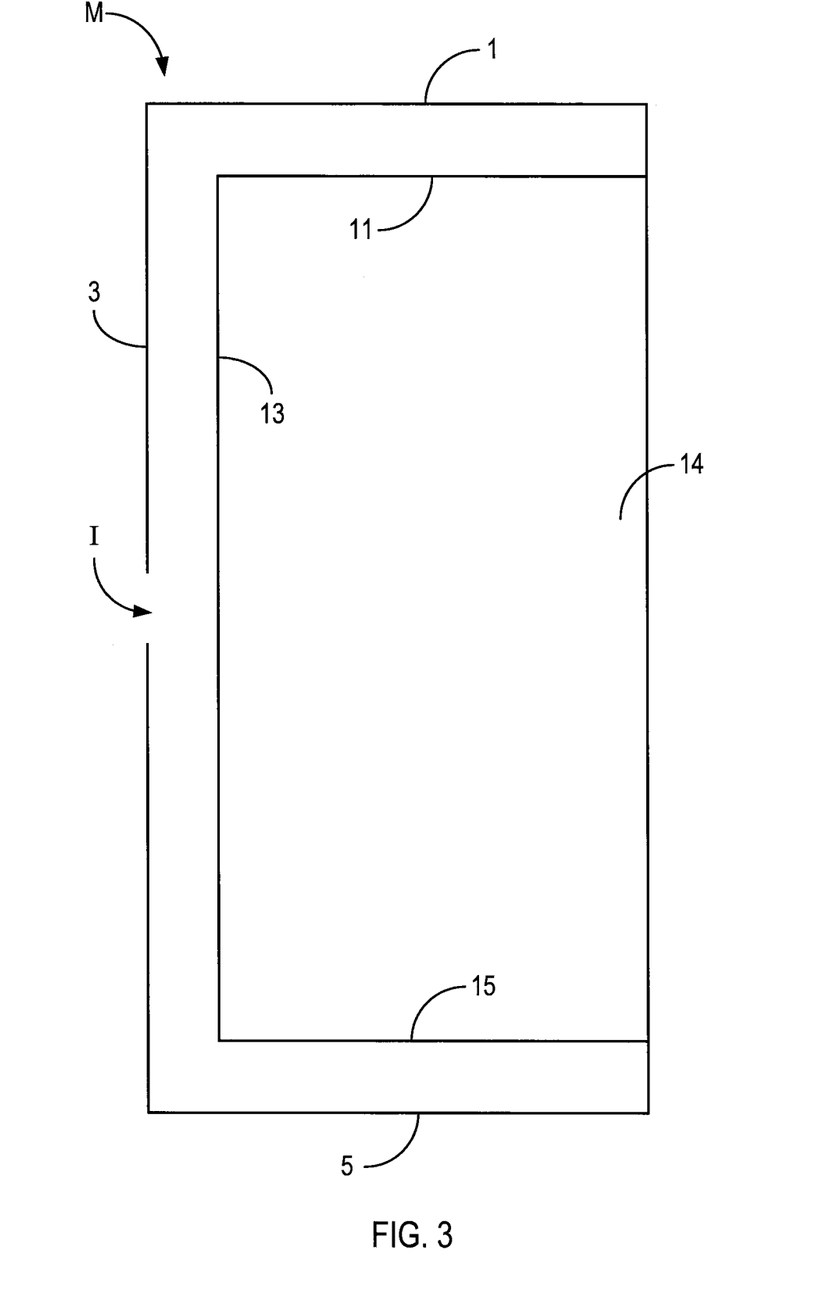
FIG. 3 shows a cross-sectional side view of open-box shaped mould.

FIG. 2A shows a front perspective view of an open-box shaped mould.

Figure 2B:
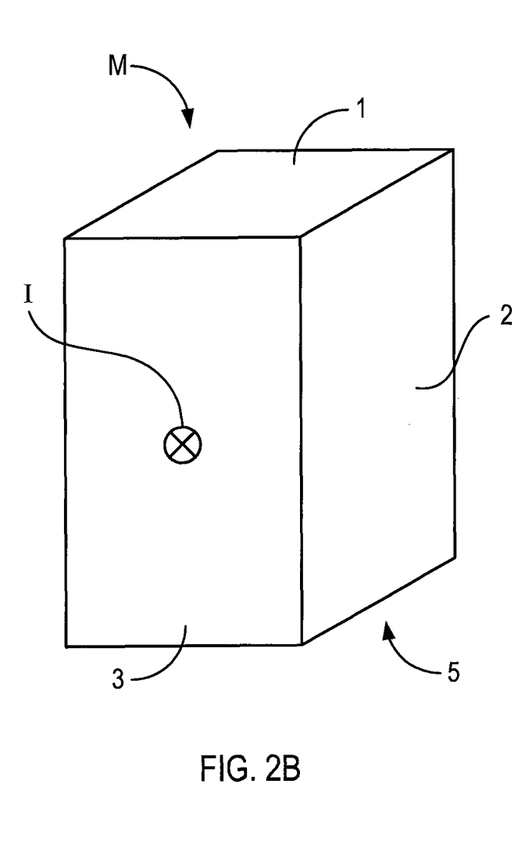
FIG. 2B shows a rear perspective view of an open-box shaped mould.

FIG. 2B shows a rear perspective view of an open-box shaped mould.

FIG. 3 shows a cross-sectional side view of open-box shaped mould.

Materials Used

The following substances were used:
Polyol 1: Polyetherpolyol with an OH-number of 450 mg KOH/g, a theoretical functionality of 4.7 and a viscosity of 15000 mPas at 25° C. (Bayer MaterialScience);
Polyol 2: Polyetherpolyol with an OH-number of 380 mg KOH/g, a theoretical functionality of 4.6 and a viscosity of 5350 mPas at 25° C. (Bayer MaterialScience);
Polyol 3: Polyetherpolyol with an OH-number of 400 mg KOH/g, a theoretical functionality of 4.0 and a viscosity of 26500 mPas at 25° C. (Bayer MaterialScience);
Polyol 4: Polyetherpolyol with an OH-number of 235 mg KOH/g, a theoretical functionality of 3 and a viscosity of 250 mPas at 25° C. (Bayer MaterialScience);
Polyol 5: Aromatic polyetherpolyol with an OH-number of 300 mg KOH/g, a theoretical functionality of 2.0 and a viscosity of 6500 mPas at 25° C., produced from the implementation of phthalic anhydride with diethylene glycol with subsequent ethyoxylation (Bayer MaterialScience);
Polyol 6: Polyetherpolyol with an OH-number of 112 mg KOH/g, a theoretical functionality of 2.0 and a viscosity of 140 mPas at 25° C. (Bayer MaterialScience);
Additive: Triethylphosphate (Brenntag GmbH)
Stabiliser: Tegostab® (Evonik)
Amine Catalyst Tertiary amine, which are very well known in the PUR-Chemistry standard catalysts and by an average skilled person.
Isocyanate: polymeric MDI (Desmodur® 44V20L, Bayer MaterialScience)
Hydroxyl values (OH values) were determined in accordance with DIN 53240 (December 1971).
Viscosities were determined in accordance with EN ISO 3219 in the October 1994 version.
Performance and Analysis of the Experiments The PUR rigid foam according to the invention is manufactured according to the one-step method known to the skilled person, in which the components are reacted continuously or discontinuously and then cured in or on suitable forms/substrates. Examples are mentioned in U.S. Pat. No. 2,761,565 A, in G. Oertel "Kunststoff-Handbuch", Vol. VII, Carl Hanser Verlag, 3. Edition, Munich 1993, p. 267 ff., as well as in K. Uhlig "Polyurethan Taschenbuch", Carl Hanser Verlag, 2. Edition, Vienna 2001, p. 83-102.

In the examples, refrigerator housings are foamed by using respective moulds by the top-flow-process as further described. For the mouldings, two component formulations consisting of a blowing agent polyol formulation (see table 1) and an isocyanate are processed by means of a conventional high pressure machine (HK 1250 of Hennecke) and a high pressure mixing head (FPL of Cannon) at a discharge performance of approximately 1770 g/s.

For the experiments, a mould M was used as partially shown unfolded to a two-dimensional plane in FIG. 1, and as shown in FIGS. 2A, 2B, and 3, having the common size and form of a freezer. The mould M is open-box-shaped and has an inner and an outer wall, between which a cavity is provided to be filled with the PUR/PIR-formulation. The inner and outer wall is arranged in a fixed distance to one another, whereas in FIG. 1, only the outer wall is shown for reasons of clarity. The outer wall comprises a bottom face 3 and a plurality of side faces 1, 2, 4, and 5. The inner wall comprises a bottom face 13 and a plurality of side faces 11, 12, 14, and 15. The small side faces 1, 5, 11, and 15 correspond to the upper and lower wall of the freezer cabinet, the larger side faces 2, 4, 12, and 14 correspond to the left and right side wall of the cabinet and the faces 3 and 13 correspond to the back wall of the cabinet.

In the middle area of the bottom face 3, an inlet opening I is positioned in which a distributor head (not shown) is fixed for injecting the polyurethane reaction mixture into the cavity. The distributor head is supported on the bottom face 13 of the inner wall and is provided with two discharge outlets in the form of slits. The discharge outlets are directed to the smaller side faces 1, 5 so that the polyurethane reaction mixture is injected to club-shaped landing zones 6, 7 in the respective directions (see FIG. 1), which extend from the distributor head to the edges of the faces 3 and 1 as well as 3 and 5, respectively.

Before filling the cavity, the mould is turned with the bottom face 3 of the outer wall downwards so that the polyurethane reaction mixture is foaming upwards to fill the cavity.

The mould M was filled with 8000 g of the respective PUR/PIR-reaction mixture. The reaction mixture was injected by the Top-Flow-Process via a distributor head centrally fixed in the rear wall of the housing. The housing was situated in a flat position, i.e. lying on the rear wall. The mould temperature was 33-36° C., the temperature of the raw materials was 20-22° C.

The processing recipes (in parts by weight) and product characteristics are summarized in table 1:

TABLE 1

Processing recipes

| Example | 1 (Invention) | 2 (Comparative) | 3 (Invention) | 4 (Comparative) |
|---|---|---|---|---|
| Polyol 1 | 43 | 65 | 43 | 32 |
| Polyol 2 | | | | 32 |
| Polyol 3 | 42 | 25 | 42 | 18 |
| Polyol 4 | | 10 | | |
| Polyol 5 | 10 | | 10 | |
| Polyol 6 | 5 | | 5 | 9 |
| Additive | | | | 2.7 |
| Water | 2.0 | 2.4 | 2.0 | 2.1 |
| Stabilizer 1 | 2.0 | | 2.0 | |
| Stabilizer 2 | | 1.5 | | |
| Stabilizer 3 | | | | 1.8 |
| Amin-Catalyst | 3.18 | 3.28 | 3.18 | 3.53 |
| Polyol formulation | 100 | 100 | 100 | 100 |
| Cyclopentane | 13.5 | 15.5 | | |
| Cyclo-/Isopentane (70/30) | | | 13.5 | 13.5 |
| Isocyanate | 130 | 161 | 130 | 130 |
| Curing time (s) | 25 | 30 | 24 | 34 |
| Raw density (kg/m³) | 21.4 | 21.4 | 21.0 | 20.1 |

Results

Thermal conductivity values were determined in accordance with DIN EN 12664 in the May 2001 version and unless otherwise specified were measured at a core temperature of 10° C.

The specified core densities were measured on the cut specimens in order to calculate the thermal conductivity in accordance with DIN EN 12664 in the May 2001 version by determining the corresponding mass.

For examples 1 and 3 the respective inventive polyol formulations were processed with short gel times of ≤25 s either with cyclopentane or a mixture of cyclopentane and isopentane (70/30) as physical blowing agent. In direct comparison thereto, examples 2 and 4 were respectively processed with polyol formulations having much slower gel times of ≥30 s. These comparative examples correspond to polyol formulations typically used in the appliance industry. Cyclopentane has been used as blowing agent in example 2 for direct comparison to the inventive example 1. In example 4, a mixture of cyclopentane and isopentane (70/30) has been used as a physical blowing agent for direct comparison to the inventive example 3.

In order to analyse the effect of the inventive fast curing polyol formulations with the top-flow process, the mouldings were tested with respect to thermal conductivity and raw density of the foam in the positions of the bottom face 3 and the side faces 1, 2, 4, 5 as shown in FIG. 1. The results are summarized in table 2.

TABLE 2

Results of the machine tests.

| Example | Pos 1 | Pos 2 | Pos 3 | Pos 4 | Pos 5 | Average | Standard deviation |
|---|---|---|---|---|---|---|---|
| Thermal conductivity at 10° C. middle temperature [mW m$^{-1}$K$^{-1}$] | | | | | | | |
| 1 (inventive) | 18.2 | 18.8 | 18.5 | 18.5 | 18.4 | 18.5 | 0.21 |
| 2 (comparison) | 18.9 | 19.9 | 19.4 | 19.6 | 19.5 | 19.5 | 0.36 |
| 3 (inventive) | 18.4 | 19.1 | 19.0 | 18.9 | 18.7 | 18.8 | 0.26 |
| 4 (comparison) | 20.2 | 20.6 | 20.9 | 21.1 | 20.7 | 20.7 | 0.34 |
| Core density [kg/m$^3$] | | | | | | | |
| 1 (inventive) | 31.0 | 30.5 | 31.0 | 30.0 | 29.0 | 30.3 | 0.84 |
| 2 (comparison) | 30.9 | 30.8 | 31.1 | 30.7 | 30.1 | 30.7 | 0.38 |
| 3 (inventive) | 32.0 | 31.0 | 31.5 | 31.0 | 30.0 | 31.1 | 0.74 |
| 4 (comparison) | 31.5 | 30.0 | 30.0 | 30.0 | 29.0 | 30.1 | 0.89 |

The results clearly demonstrate that the thermal conductivity is improved by approx. 5% comparing example 1 with example 2 and up to approx. 10% comparing example 3 with example 4 by the combination of the top-flow-process with the inventive fast curing polyol formulations. In addition, it is apparent that the improvement of the thermal conductivity is independent from the physical blowing agent, as it could be achieved for cyclopentane as well as for the mixture of cyclopentane and isopentane (70/30).

LIST OF REFERENCE NUMBERS

1 side face
2 side face
3 bottom face
4 side face
5 side face
6 club-shaped landing zone
7 club-shaped landing zone
M mould
I inlet opening
D distributor head

The invention claimed is:

1. A method for manufacturing an insulation moulding comprising
   filling a cavity between an inner and an outer wall of an open-box-shaped mould with a polyurethane reaction mixture and
   allowing the polyurethane reaction mixture to cure to a polyurethane comprising polymer C,
      wherein the inner and outer wall being arranged a fixed distance from one another and each wall comprising a bottom face and a plurality of side faces, wherein the fixed distance between the inner and outer wall can be the same or different for each face,
      wherein the polyurethane reaction mixture is fed through an inlet opening positioned in a middle area of the bottom face of the outer wall,
      wherein before filling the cavity, the mould is turned with the bottom face of the outer wall downwards so that the polyurethane reaction mixture is foaming upwards to fill the cavity,
      wherein the polyurethane reaction mixture comprises an isocyanate component B, which is reacted with an emulsion comprising (I) an isocyanate-reactive composition A, comprising a polyol mixture A1 comprising at least three polyols A1a, A1b and A1c as a continuous phase and (II) at least one physical blowing agent T as a disperse phase, wherein:

(i) A1a is a polyether polyol having a hydroxyl value from 15 mg KOH/g to 550 mg KOH/g and an OH functionality from 1.5 to 6.0, obtained by addition of an epoxy to at least one starter compound selected from the group consisting of carbohydrates, difunctional alcohols, and higher-functional alcohols;

(ii) A1b is a polyether polyol having a hydroxyl value from 100 mg KOH/g to 550 mg KOH/g and an OH functionality from 1.5 to 5.0, obtained by addition of an epoxy to an aromatic amine;

(iii) A1c is a polyester polyether polyol having a hydroxyl value from 100 mg KOH/g to 450 mg KOH/g and an OH functionality from 1.5 to 3.5, obtained by addition of an epoxy to an esterification product of an aromatic dicarboxylic acid derivative and a difunctional and/or higher-functional alcohol.

2. The method according to claim 1, wherein the physical blowing agent T has an average droplet size of ≥0.1 μm to ≤20 μm, the droplet size being determined using an optical microscope operating in bright field transmission mode.

3. The method according to claim 1, wherein the starter compound for polyether polyol A1a is at least one of sucrose, a mixture of sucrose and propylene glycol, a mixture of sucrose and ethylene glycol, a mixture of sucrose, propylene glycol and ethylene glycol, sorbitol or a mixture of sorbitol and glycerol.

4. The method according to claim 1, wherein the aromatic amine is ortho-, meta- or para-toluoylene diamine or a mixture of isomeric toluoylene diamines; and/or wherein the polyester polyether polyol A1e is a polyester polyether polyol obtained by addition of an epoxy to an esterification product of a phthalic acid derivative with a difunctional or higher-functional alcohol selected from the group consisting of 1,2-propanediol, dipropylene glycol and higher homologues thereof, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol including higher homologues thereof, 2-methyl propanediol-1,3, neopentyl glycol, 3-methyl pentanediol-1,5, glycerol, pentaerythritol, 1,1,1-trimethylolpropane and carbohydrates having 5 to 12 carbon atoms; and/or wherein the polyol mixture Al additionally comprises: (iv) a polyether polyol A1d based on an aliphatic amine or a polyhydric alcohol and having a hydroxyl value from 500 mg KOH/g to 1000 mg KOH/g and a functionality from 1.5 to 5.0; and/or wherein the polyol mixture AI additionally comprises a polyether polyol A1g based on a polyhydric alcohol and having a hydroxyl value from 15 mg KOH/g to 550 mg KOH/g and a functionality from 1.5 to 5.0.

5. The method according to claim 1, wherein the polyol mixture A1 additionally comprises: (v) a difunctional to tetrafunctional amine-type or alcoholic chain extender or crosslinker.

6. The method according to claim 1, wherein the physical blowing agent T is selected from at least one member of the group consisting of hydrocarbons, halogenated ethers and perfluorinated hydrocarbons having 1 to 8 carbon atoms.

7. The method according to claim 1, wherein the isocyanate-reactive composition A additionally comprises (vi) water A2;

(vii) at least one stabiliser A3 selected from the group of polyether-polydimethyl siloxane copolymers; and (viii) at least one catalyst A4 selected from the group consisting of triethylenediamine, N,N-dimethylcyclohexylamine, dicyclohexylmethylamine, tetramethyl 1 enediamine, 1-methy 1-4-dimethylaminoethy 1 piperazine, triethylamine, tributylamine, dimethylbenzylamine, N,N',N"-tris-(dimethylaminopropyl)hexahydrotriazine, tris-(dimethylaminopropyl)-amine, tris(dimethylaminomethyl)phenol, dimethylaminopropyl formamide, N,N,N',N'tetramethyl ethylenediamine, N,N,N',N'-tetramethyl butanediamine, tetramethyl hexanediamine, pentamethyl-diethylenetriamine, pentamethyl dipropylenetriamine, tetramethyl diaminoethyl ether, dimethyl piperazine, 1,2-dimethyl imidazole, 1-azabicyclo[3.3.0]octane, bis-(dimethylaminopropyl) urea, N-methylmorpholine, N-ethylmorpholine, sodium-N-[(2-hydroxy-5-nonylphenyl) methyl]-N-methylaminoacetate, N-cyclohexyl morpholine, 2,3-dimethyl-3,4,5,6-tetrahydropyrimidine, triethanolamine, diethanolamine, triisopropanolamine, N-methyl diethanolamine, N-ethyl diethanolamine.

8. The method according to claim 1, wherein the mass ratio of A1:T is ≥5:1 to ≤12:1.

9. The method according to claim 1, wherein the polyol component A1 has a viscosity according to EN ISO 3219 at 25° C. of ≥1000 mPas to ≤18000 mPas.

10. The method according to claim 1, wherein the isocyanate component B is a) at least one isocyanate B 1 selected from the group consisting of toluoylene diisocyanate, diphenylmethane diisocyanate, polyphenyl polymethylene polyisocyanate, xylylene diisocyanate, naphthylene diisocyanate, hexamethylene diisocyanate, diisocyanatodicyclohexylmethane and isophorone diisocyanate, or b) an isocyanate-terminated prepolymer B2 produced from the at least one isocyanate B1 and at least one isocyanate-reactive compound selected from at least one of the following polyols b.1) polyether polyol having a hydroxyl value from 15 mg KOH/g to 550 mg KOH/g and a functionality from 1.5 to 6.0, obtained by addition of an epoxy to at least one starter compound selected from carbohydrates and difunctional or higher-functional alcohols (A1a);

b.2) polyether polyol having a hydroxyl value from 100 mg KOH/g to 550 mg KOH/g and a functionality from 1.5 to 5.0, obtained by addition of an epoxy to an aromatic amine (A1b);

b.3) polyester polyether polyol having a hydroxyl value from 100 mg KOH/g to 450 mg KOH/g and a functionality from 1.5 to 3.5, obtained by addition of an epoxy to an esterification product of an aromatic dicarboxylic acid derivative and a difunctional or higher-functional alcohol (A1c);

b.4) polyether polyol having a hydroxyl value from 500 mg KOH/g to 1000 mg KOH/g and a functionality from 1.5 to 5.0 (A1d);

b.5) polyether carbonate polyol having a functionality of ≥1.0 to 8.0 and a number-average molar mass from 400 g/mol to 10,000 g/mol (A1f), b.6) polyether polyol having a functionality of 1.5 to 5.0 and a hydroxyl value from 15 mg KOH/g to 550 mg KOH/g (A1 g)

or c) a mixture of B1 and B2.

11. The method according to claim 1, wherein reaction of the isocyanate component B with the emulsion is performed at an isocyanate index of 95 to 130.

12. The method according to claim 1, wherein the middle area of the bottom face of the outer wall is arranged concentrically in a two-dimensional projection of the bottom face and/or wherein the middle area of the bottom face of the outer wall is defined by a segment of the bottom face which extends from a centroid of a two-dimensional projection of the bottom face to not more than 10% of a longitudinal extent of a two-dimensional projection in each direction.

13. The method according to claim 1, wherein the mould is provided with at least one ventilation hole and/or wherein the cavity is evacuated to a pressure lower than ambient pressure.

14. The method according to claim 1, wherein the polyurethane reaction mixture is injected into the cavity through an injection nozzle being arranged at the inlet opening, wherein the inlet opening and/or the injection nozzle is provided with a baffle plate and/or a distributor head, wherein the distributor head is provided with a plurality of discharge outlets and/or wherein a plurality of discharge outlets are formed between the distributor head and a bottom face of the outer wall, the polyurethane reaction mixture being injected through the discharge outlets into the cavity in a substantially laminar manner, wherein the discharge outlets are in the shape of slits.

15. The method according to claim 14, wherein the distributor head is arranged at the inlet opening, fixed to the bottom face of the outer wall and supported on the bottom face of the inner wall, and/or wherein the discharge outlets are arranged in such a way that the polyurethane reaction mixture is injected into the cavity substantially parallel to the bottom face of the outer wall.

16. The method according to claim 1, wherein the physical blowing agent T has an average droplet size of ≥0.1 μm to ≤15 μm, the droplet size being determined using an optical microscope operating in bright field transmission mode.

17. The method according to claim 4, wherein the polyol mixture A1 additionally comprises a polyether polyol A1g based on a polyhydric alcohol and having a hydroxyl value from 20 mg KOH/g to 530 mg KOH/g and a functionality from 1.5 to 4.0.

18. The method according to claim 4, wherein the polyol mixture A1 additionally comprises a polyether polyol A1g based on a polyhydric alcohol and having a hydroxyl value from 25 mg KOH/g to 515 mg KOH/g and a functionality from 1.5 to 4.0.

19. The method according to claim 12, wherein the middle area of the bottom face of the outer wall is defined by a segment of the bottom face which extends from a centroid of the two-dimensional projection of the bottom face to not more than 5% of the longitudinal extent of a two-dimensional projection in each direction.

20. The method according to claim 13, wherein the pressure is reduced by ≥1 mbar to ≤900 mbar.

21. The method according to claim 13, wherein the pressure is reduced by ≥20 mbar to ≤600 mbar.

22. The method according to claim 13, wherein the pressure is reduced by ≥50 mbar to ≤300 mbar.

* * * * *